(12) United States Patent
Kim et al.

(10) Patent No.: US 8,570,978 B2
(45) Date of Patent: Oct. 29, 2013

(54) METHOD AND APPARATUS FOR PERFORMING HANDOVER

(75) Inventors: Ho-dong Kim, Gwacheon-si (KR);
Hae-young Jun, Seoul (KR);
Hyuk-choon Kwon, Seoul (KR);
Dong-seek Park, Yongin-si (KR);
Soo-yeon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 13/034,197

(22) Filed: Feb. 24, 2011

(65) Prior Publication Data

US 2011/0207460 A1 Aug. 25, 2011

Related U.S. Application Data

(60) Provisional application No. 61/308,072, filed on Feb. 25, 2010.

(30) Foreign Application Priority Data

Jun. 18, 2010 (KR) ........................ 10-2010-0058230

(51) Int. Cl.
*H04W 4/00* (2009.01)
(52) U.S. Cl.
USPC ......................................................... 370/331
(58) Field of Classification Search
None
See application file for complete search history.

(56) References Cited

U.S. PATENT DOCUMENTS

| 7,796,555 | B2 | 9/2010 | Jeon et al. | |
|---|---|---|---|---|
| 2008/0026760 | A1* | 1/2008 | Park et al. | 455/437 |
| 2008/0112364 | A1 | 5/2008 | Kwon et al. | |
| 2009/0257403 | A1* | 10/2009 | Jeon et al. | 370/331 |

FOREIGN PATENT DOCUMENTS

KR 10-2009-0060399 A 6/2009

OTHER PUBLICATIONS

International Search Report (PCT/ISA/210) and Written Opinion (PCT/ISA/237), issued by the International Searching Authority in corresponding International Application No. PCT/KR2011/001169 on Oct. 27, 2011.

Communication dated Mar. 15, 2013, issued by the Mexican Patent Office in counterpart Mexican patent Application No. MX/A/2012/009140.

\* cited by examiner

*Primary Examiner* — John Blanton
(74) *Attorney, Agent, or Firm* — Sughrue Mion, PLLC

(57) ABSTRACT

A method of performing a handover between a first device and a second device is provided. The method including: transmitting a handover request frame for requesting a handover, including information about a reason for requesting the handover, to the second device; receiving a handover response frame including handover request result information indicating whether the handover request is accepted, from the second device; and selectively performing the handover with the second device based on the handover response frame.

21 Claims, 5 Drawing Sheets

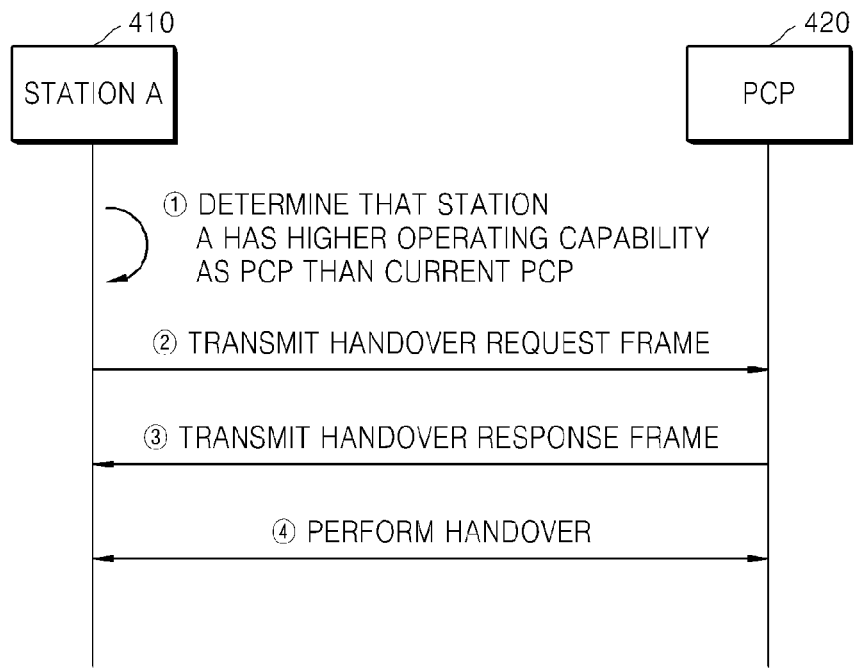
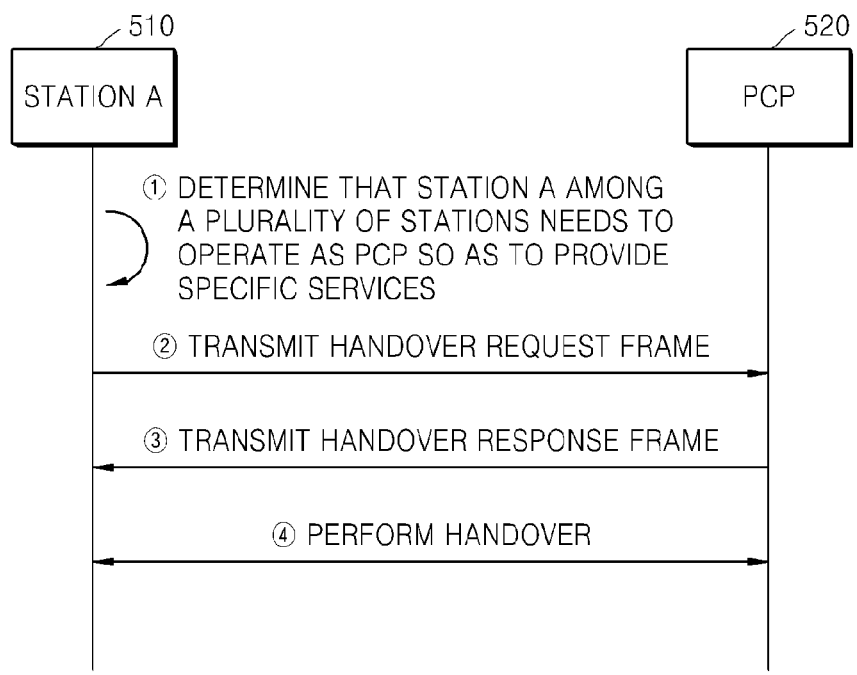

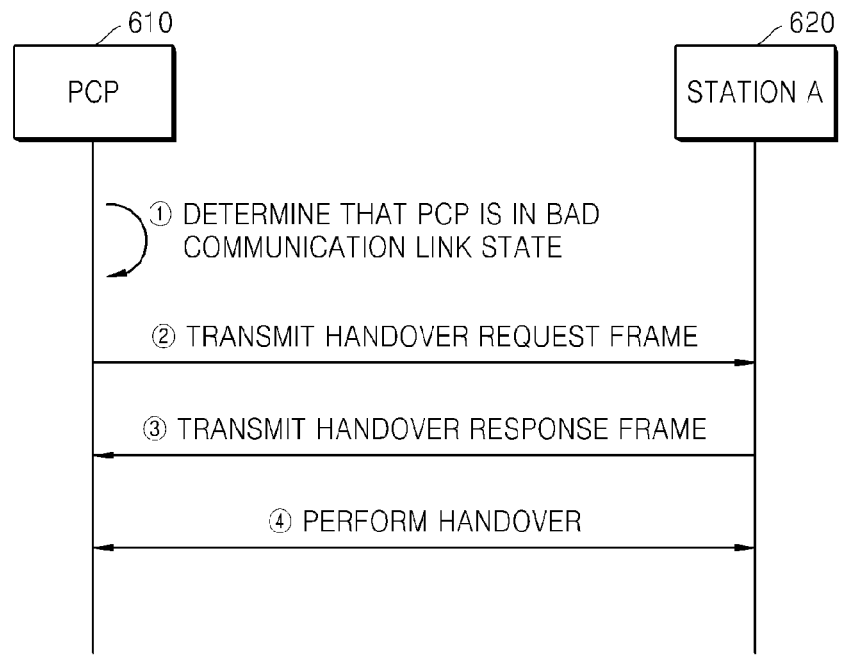
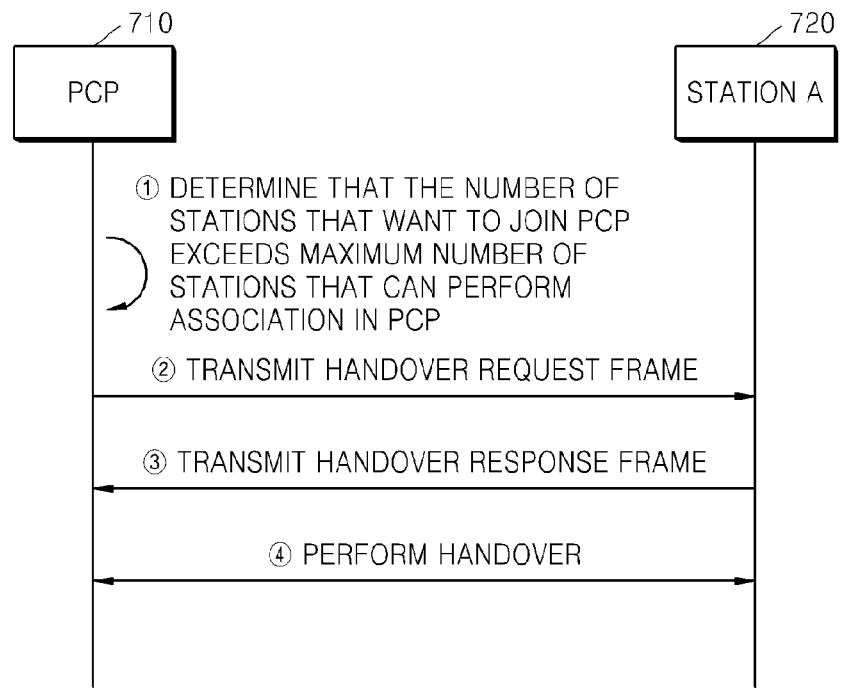

METHOD AND APPARATUS FOR PERFORMING HANDOVER

CROSS-REFERENCE TO RELATED PATENT APPLICATION

This application claims priority from U.S. Patent Provisional Application No. 61/308,072, filed on Feb. 25, 2010 and Korean Patent Application No. 10-2010-0058230, filed on Jun. 18, 2010, in the Korean Intellectual Property Office, the disclosures of which are incorporated herein in their entirety by reference.

BACKGROUND

1. Field

Methods and apparatuses consistent with the exemplary embodiment relate to performing a handover.

2. Description of the Related Art

A basic service set (BSS) in a wireless local area network (WLAN) is a network including one access point (AP) and a plurality of stations. A BSS refers to a network constituted in such a way that a plurality of stations are always to perform communication through an AP except for predetermined cases, such as a direct link setup (DLS) or a tunneled direct link setup (TDLS). In this case, the AP cannot handover its AP function to a station.

A wireless personal area network (WPAN) is a network including a coordinator and a plurality of stations. A WPAN, unlike a BSS, refers to a network constituted in such a way that a plurality of stations are able to perform communication with each other without a coordinator that corresponds to an AP. Also, in a WPAN system, since a station functioning as a coordinator may be present among a plurality of stations, when the coordinator must handover its role to another station, the coordinator hands over its role to a station capable of functioning as the coordinator. An operation by which a coordinator hands over its role to a station is referred to as a handover.

SUMMARY

The exemplary embodiments provide a method and apparatus for performing a handover.

According to an aspect of the exemplary embodiments, there is provided a method of performing a handover between a first device and a second device, the method including transmitting a handover request frame for requesting a handover, including information about a reason for requesting the handover, to the second device; receiving a handover response frame including handover request result information indicating whether the handover request is accepted, from the second device; and selectively performing the handover with the second device based on the handover response frame.

The first device and the second device may both belong to a personal basic service set (PBSS), and the first device may be a station, and the second device may be a PBSS control point (PCP) in the PBSS.

The reason for requesting the handover may be that the first device has a higher operating capability as a PCP than the second device or that the first device is to operate as a PCP so as to provide specific services, and the handover request frame may be transmitted only when the first device has one of the reasons for requesting the handover.

The handover response frame may further include information about a reason for rejecting the handover request when the handover request result information indicates rejection of the handover request.

The reason for rejecting the handover request may be that the remaining amount of power of the first device is less than a predetermined threshold value, that the first device is in a bad communication link state, that the number of stations joined with the second device exceeds a maximum number of stations that can perform association with (or be associated with) the first device, that the first device is being affected by interference, that a region of the first device in which communication is available is smaller than a region of the second device in which communication is available and thus the first device is to join with less stations than the second device, that the first device is leaving the PBSS, that the second device is providing specific services, that the number of beacon intervals (BIs) that remain in the second device when the first device transmits the handover request frame, is less than a threshold value, or that the first device wants to change a currently-used frequency band of a communication link into a different frequency band.

The first device and the second device may both belong to a PBSS, and the first device may be a PCP in the PBSS, and the second device may be a station.

When the first device and the second device both belong to a PBSS, and the first device is a PCP in the PBSS, and the second device is a station, the reason for requesting the handover may be that the first device is leaving the PBSS, that the remaining amount of power of the first device is less than a predetermined threshold value, that there is a station having a higher operating capability as a PCP than the first device, that the first device is in a bad communication link state, or that the number of stations to join the first device exceeds a maximum number of stations that can perform association with the first device.

When the first device and the second device both belong to a PBSS, and the first device is a PCP in the PBSS, and the second device is a station, the handover response frame may further include information about a reason for rejecting the handover request when the handover request result information indicates rejection of the handover request.

When the first device and the second device both belong to a PBSS, and the first device is a PCP in the PBSS, and the second device is a station, the reason for rejecting the handover request may be that the remaining amount of power of the second device is low, that the second device is in a bad communication link state, that the number of stations joined with the first device exceeds a maximum number of stations that can perform association with the second device, that the second device is being affected by interference, that the second device is to continuously provide specific services, that a region of the second device in which communication is available is smaller than a region of the first device in which communication is available and thus the second device is to join with less stations than the first device, that the second device is providing services in which a quality of service (QoS) should be guaranteed, that the second device is leaving the PBSS, or that the second device is to change a currently-used frequency band of a communication link into a different frequency band.

The handover request frame may further include information about the number of BIs that remain in the second device, during a period between the time when the handover request frame is transmitted and the time when the handover takes effect.

According to another aspect of the exemplary embodiments, there is provided an apparatus for performing a handover between a first device and a second device, the apparatus including a transmission unit transmitting a handover request frame for requesting a handover, including information about a reason for requesting the handover, to the second device; a receiving unit receiving a handover response frame including handover request result information indicating whether the handover request is accepted, from the second device; and a handover performing unit selectively performing the handover with the second device based on the handover response frame.

According to another aspect of the exemplary embodiments, there is provided a computer readable recording medium having recorded thereon a program for executing a method of performing a handover between a first device and a second device, the method including transmitting a handover request frame for requesting a handover, including information about a reason for requesting the handover, to the second device; receiving a handover response frame including handover request result information indicating whether the handover request is accepted, from the second device; and selectively performing the handover with the second device based on the handover response frame.

BRIEF DESCRIPTION OF THE DRAWINGS

The above and other aspects will become more apparent by describing in detail exemplary embodiments thereof with reference to the attached drawings in which:

FIG. 4 is a flowchart illustrating a method of performing a handover when a station requests to perform a handover with a personal basic service set (PBSS) control point (PCP), according to an exemplary embodiment;

FIG. 5 is a flowchart illustrating a method of performing a handover when a station requests to perform a handover with a PCP, according to another exemplary embodiment;

FIG. 6 is a flowchart illustrating a method of performing a handover when a PCP requests to perform a handover with a station, according to an exemplary embodiment;

FIG. 7 is a flowchart illustrating a method of performing a handover when a PCP requests to perform a handover with a station, according to another exemplary embodiment.

DETAILED DESCRIPTION OF THE EXEMPLARY EMBODIMENTS

The inventive concept will now be described more fully with reference to the accompanying drawings, in which exemplary embodiments are shown.

Figure 1:
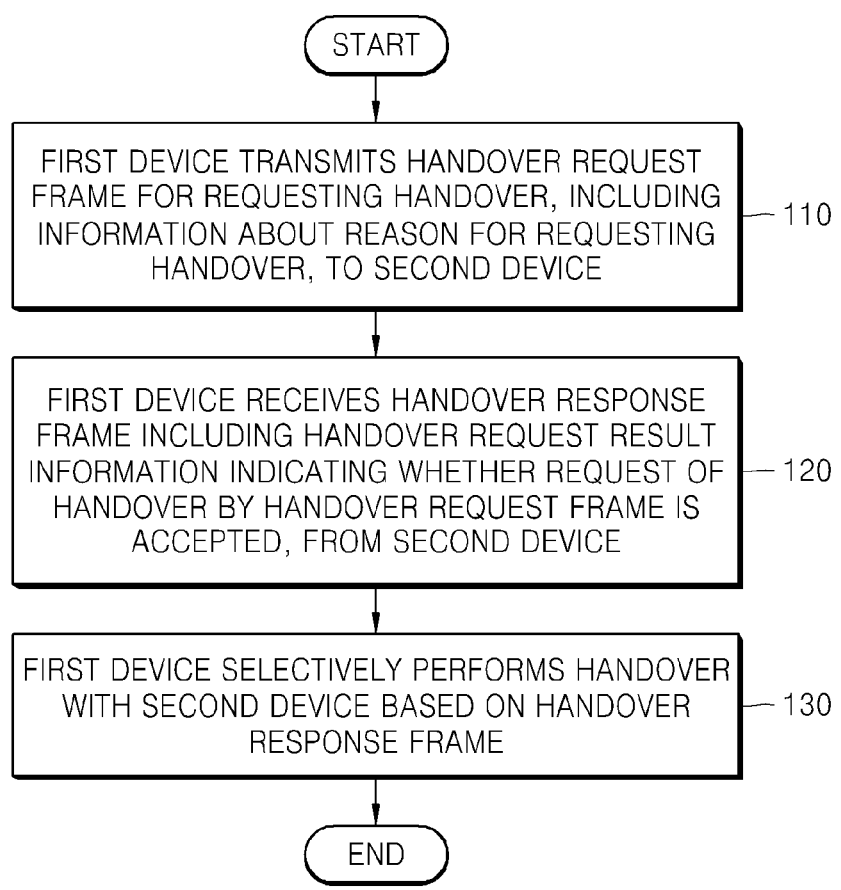
FIG. 1 is a flowchart illustrating a method of performing a handover according to an exemplary embodiment.

FIG. 1 is a flowchart illustrating a method of performing a handover according to an exemplary embodiment. Hereinafter, a method of performing a handover by using a first device and a second device, both belonging to a personal basic service set (PBSS), will be described. In more detail, the PBSS, unlike a basic service set (BSS), is a network constituted in such a way that stations thereof are able to perform communication with each other without a coordinator corresponding to an access point (AP), and/which is similar to a wireless personal area network (WPAN) system. However, a WPAN system is not connected to an external network, whereas the PBSS may be connected to an external network.

In Operation 110, the first device transmits a handover request frame for requesting a handover, including information about a reason for requesting the handover, to the second device.

In this regard, when the first device is a station, the second device may be a coordinator, and when the first device is a coordinator, the second device may be a station.

A structure of the handover request frame according to an exemplary embodiment will be described later with reference to FIG. 2.

In Operation 120, the first device receives a handover response frame including handover request result information indicating whether the handover request corresponding to the handover request frame is accepted, from the second device.

A structure of the handover response frame according to an exemplary embodiment will be described later with reference to FIG. 3.

In Operation 130, the first device selectively performs the handover with the second device based on the handover response frame.

For example, when the handover request result information included in the handover response frame indicates acceptance of the handover request, the handover between the first device and the second device will be performed. However, when the handover request result information indicates rejection of the handover request, the handover between the first device and the second device will not be performed. In this specification, a coordinator in the PBSS may be referred to as a PBSS control point (PCP), and hereinafter, will be referred to as a PCP.

Figure 2:
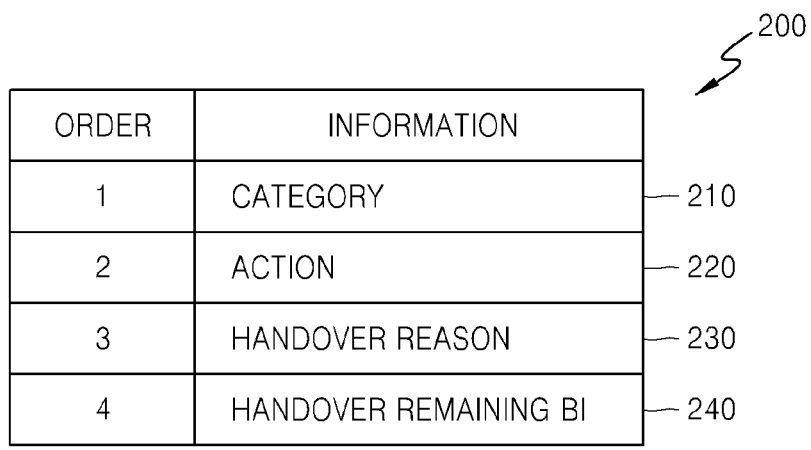
FIG. 2 is a block diagram of a structure of a handover request frame according to an exemplary embodiment.

FIG. 2 is a block diagram of a structure of a handover request frame 200 according to an exemplary embodiment.

Referring to FIG. 2, the handover request frame 200 according to the current exemplary embodiment includes a category field 210, an action field 220, a handover reason field 230, and a handover remaining beacon interval (BI) field 240.

The category field 210 indicates a category to which the handover request frame 200 belongs. For example, when there are two categories, such as an mmWave category, that is, a category indicating frames for mmWave communication in a PBSS, and a frequency band change category indicating frames for frequency band change, for example, fast session transfer (FST), the category to which the handover request 200 belongs may be the mmWave category.

The action field 220 indicates that the handover request frame 200 is a frame requesting the handover.

The information about the reason for requesting the handover is recorded in the handover reason field 230. In this regard, the reason for requesting the handover recorded in the handover reason field 230 may vary depending on whether the first device is a station or a PCP.

For example, when the first device is a station requesting a handover, the reason for requesting the handover may be, for example, that the first device has a higher operating capability as a PCP than a current PCP or that the first device is to operate as a PCP for providing specific services.

However, when the first device is a PCP, the reason for requesting the handover may be, for example, that the first device is leaving the PBSS, that the remaining amount of power of the first device is less than a predetermined threshold value, that there is a station having a higher operating capability as a PCP than the first device, that the first device is in a bad communication link state, or that the number of stations that are to join with the first device exceeds the maximum number of stations that can perform association with the first device, or be associated with the first device. However, the reason for requesting the handover is not limited to the above-described examples. For example, when the first device is a station, the reason, or reasons, for requesting the handover may be at least one of the reasons for requesting the handover corresponding to when the first device is a PCP, and similarly, when the first device is a PCP, the reason, or reasons, for requesting the handover may be at least one of the reasons for requesting the handover corresponding to when the first device is a station. Also, the reason for requesting the handover may be a simple reason. For example, the reason may be that a station requesting the handover wants to be a PCP.

The handover remaining BI field 240 indicates information about the number of BIs that remain in a PCP during a period between the time when the handover request frame is transmitted and the time when the handover takes effect.

Figure 3:
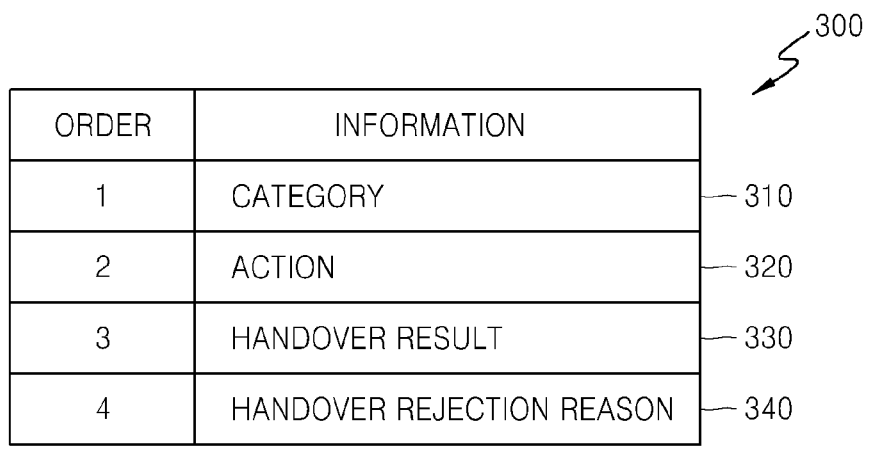
FIG. 3 is a block diagram of a structure of a handover response frame according to an exemplary embodiment.

FIG. 3 is a block diagram of a structure of a handover response frame 300 according to an exemplary embodiment.

Referring to FIG. 3, the handover response frame 300 according to the current exemplary embodiment includes a category field 310, an action field 320, a handover result field 330, and a handover rejection reason field 340.

The category field 310 indicates a category to which the handover response frame 300 belongs. For example, the category to which the handover response frame 300 belongs may be the mmWave category described above.

The action field 320 indicates that the handover response frame 300 is a response frame that indicates whether the handover request corresponding to the handover request frame (see 200 of FIG. 2) is accepted. The handover request result information, which indicates whether the handover request is accepted, is recorded in the handover result field 330.

If the handover request is rejected, information about a reason for rejecting the handover request is recorded in the handover rejection reason field 340.

In this regard, the reason for rejecting the handover request recorded in the handover rejection reason field 340 may vary depending on whether the second device is a station or a PCP.

For example, when the second device is a PCP, the reason for rejecting the handover request may be, for example, that the remaining amount of power of a station requesting a handover is less than a predetermined threshold value, that the station requesting the handover is in a bad communication link state, that the number of stations joined with the second device exceeds the maximum number of stations that can perform association with the station requesting the handover, that the station requesting the handover is affected by interference, that a region of the station requesting the handover in which communication is available is smaller than a region of the second device in which communication is available and thus the station requesting the handover may be joined with less stations than the second device, that the station requesting the handover is leaving the PBSS, that the second device is providing specific services, that the number of BIs that remain in the second device, when the first device requesting a handover transmits a handover request frame, is less than a threshold value, or that the station requesting the handover is to change a currently-used frequency band of a communication link into a different frequency band.

In this regard, when the second device is providing specific services, the reason for rejecting the handover request may be that the second device is already performing a handover with another station.

In addition, the reason for rejecting the handover request when the number of BIs that remain in the second device, when the first device requesting a handover transmits a handover request frame, is less than a threshold value will now be described. For example, when the second device is set to function as a PCP during 100 BIs (or super frame) and the second device receives the handover request frame from the station requesting the handover while performing an operation at the $95^{th}$ BI, if a BI threshold value is 6, the number of BIs that remain in the PCP, that is, 5, is smaller than the BI threshold value and thus the handover request may be rejected.

When the second device is a station, the reason for rejecting the handover request may be, for example, that the remaining amount of power of the second device is low, that second device is in a bad communication link state, that the number of stations joined with a PCP transmitting the handover request exceeds the maximum number of stations that can perform association with the second device, that the second device is being affected by interference, that the second device is to continuously provide specific services, that a region of the second device in which communication is available is smaller than a region of the PCP transmitting the handover request in which communication is available and thus the second device may be able to join less stations than the PCP (transmitting the handover request), that the second device is providing services in which a quality of service (QoS) should be guaranteed, that the second device is leaving the PBSS, or that the second device is to change a currently-used frequency band of a communication link into a different frequency band. Services in which a quality of service (QoS) should be guaranteed may comprise transmitting audio/video (A/V) contents.

However, the reason for rejecting the handover request is not limited to the above-described examples. For example, when the second device is a PCP, the reason, or reasons, for rejecting the handover request may further include at least one of the reasons for rejecting the handover request corresponding to when the second device is a station, and similarly, when the second device is a station, the reason, or reasons, for rejecting the handover request may further include at least one of the reasons for rejecting the handover request corresponding to when the second device is a PCP.

Here, it is assumed that the first device and the second device have recognized the capability and current state of each other by periodically transmitting information about their capabilities and states to each other.

In another exemplary embodiment, when the handover rejection reason field 340 has a value of 0, the information about the reason for rejecting the handover request is not recorded in the handover rejection reason field 340, and when the handover rejection reason field 340 has a value of 1, the handover rejection reason field 340 includes information about at least one of the reasons for rejecting the handover request described above.

FIG. 4 is a flowchart illustrating a method of performing a handover when a station requests to perform a handover with a PCP, according to an exemplary embodiment.

In operation 1, it is determined that a station A 410 among a plurality of stations has a higher operating capability as a PCP than a current PCP 420.

In this regard, the station A 410 should recognize the capability and state of the PCP 420 and compare its capability and state with the capability and state of the PCP 420, thereby determining whether the station A 410 has a higher operating capability as a PCP than the current PCP 420.

In operation 2, the station A 410 transmits a handover request frame including information about a reason for requesting a handover to the PCP 420.

In this regard, the reason for requesting the handover may be that the station A 410 has a higher operating capability as a PCP than the current PCP 420. The current exemplary embodiment is different from the related art in that, in the current exemplary embodiment, a station can first request to perform a handover with a PCP, whereas in the related art, only a PCP can request to perform a handover with a station. In addition, since the station A 410 transmits the information about the reason for requesting the handover to the PCP 420 while requesting to perform the handover with the PCP 420, the PCP 420 may determine whether to accept the handover request by the station based on the reason for requesting the handover.

In operation 3, the PCP 420 transmits a handover response frame to the station A 410 indicating whether the handover request corresponding to the handover request frame is accepted.

In the current exemplary embodiment, the reason for requesting the handover is determined to be reasonable, and thus the PCP 420 will transmit the handover response frame accepting the handover request by the station A 410 to the station A 410. However, if the PCP 420 determines that the reason for requesting the handover is not reasonable, the PCP 420 will transmit the handover response frame rejecting the handover request by the station A 410 to the station A 410.

In operation 4, the PCP 420 hands over its role of coordinator to the station A 410 by performing the handover with the station A 410.

FIG. 5 is a flowchart illustrating a method of performing a handover when a station requests to perform a handover with a PCP, according to another exemplary embodiment.

In operation 1, it is determined that a station A 510 among a plurality of stations is to operate as a PCP so as to provide specific services.

In operation 2, the station A 510 transmits a handover request frame including information about a reason for requesting a handover to a PCP 520. In this regard, the reason for requesting the handover may be that the station A 510 is to operate as a PCP so as to provide specific services.

In operation 3, the PCP 520 transmits a handover response frame to the station A 510 indicating whether the handover request corresponding to the handover request frame is accepted.

In the current exemplary embodiment, the reason for requesting the handover is determined to be reasonable, and thus the PCP 520 will transmit the handover response frame accepting the handover request by the station A 510 to the station A 510.

In operation 4, the PCP 520 hands over its role of coordinator to the station A 510 by performing the handover with the station A 510.

FIG. 6 is a flowchart illustrating a method of performing a handover when a PCP requests to perform a handover with a station, according to an exemplary embodiment.

In operation 1, a PCP 610 determines that it is in a bad communication link state.

For example, the PCP 610 performs communication at a frequency band of 60 GHz. When a signal-to-noise ratio (SNR) of data received from a communication link at the frequency band of 60 GHz is low, the PCP 610 may determine that its own communication link state is bad.

In operation 2, the PCP 610 transmits a handover request frame including information about a reason for requesting a handover to one of a plurality of stations that may operate as a PCP, for example, a station A 620.

In this regard, the reason for requesting the handover may be that the PCP 610 is in a bad communication link state.

In operation 3, the station A 620 transmits a handover response frame to the PCP 610 indicating whether the handover request corresponding to the handover request frame is accepted.

In the current exemplary embodiment, the reason for requesting the handover is determined to be reasonable, and thus the station A 620 will transmit the handover response frame accepting the handover request by the PCP 610 to the PCP 610.

In operation 4, the station A 620 becomes a coordinator from the PCP 610 by performing the handover with the PCP 610.

FIG. 7 is a flowchart illustrating a method of performing a handover when a PCP requests to perform a handover with a station, according to another exemplary embodiment.

In operation 1, a PCP 710 determines that the number of stations that are to join the PCP 710 exceeds the maximum number of stations that can perform association with the PCP 710.

For example, an eleventh station may be requesting to join the PCP 710 when the maximum number of stations that can perform association with the PCP 710 is 10.

In operation 2, the PCP 710 transmits a handover request frame including information about a reason for requesting a handover to a station that may operate as a PCP, for example, a station A 720.

In this regard, the PCP 710 should recognize the capability of the station A 720 and compare the capability of PCP 710 with the capability of the station A 720. If it is determined that the maximum number of stations that can perform association with the station A 720 is greater than the maximum number of stations that can perform association with the PCP 710, the PCP 710 transmits the handover request frame to the station A 720.

The reason for requesting the handover may be that the number of stations that are to join the PCP 710 exceeds the maximum number of stations that can perform association with the PCP 710.

In operation 3, the station A 720 transmits a handover response frame indicating whether the handover request corresponding to the handover request frame is accepted to the PCP 710.

In the current exemplary embodiment, the reason for requesting the handover is determined to be reasonable, and thus the station A 720 will transmit the handover response frame accepting the handover request by the PCP 710 to the PCP 710.

In operation 4, the station A 720 becomes a coordinator by performing the handover with the PCP 710.

Figure 8:
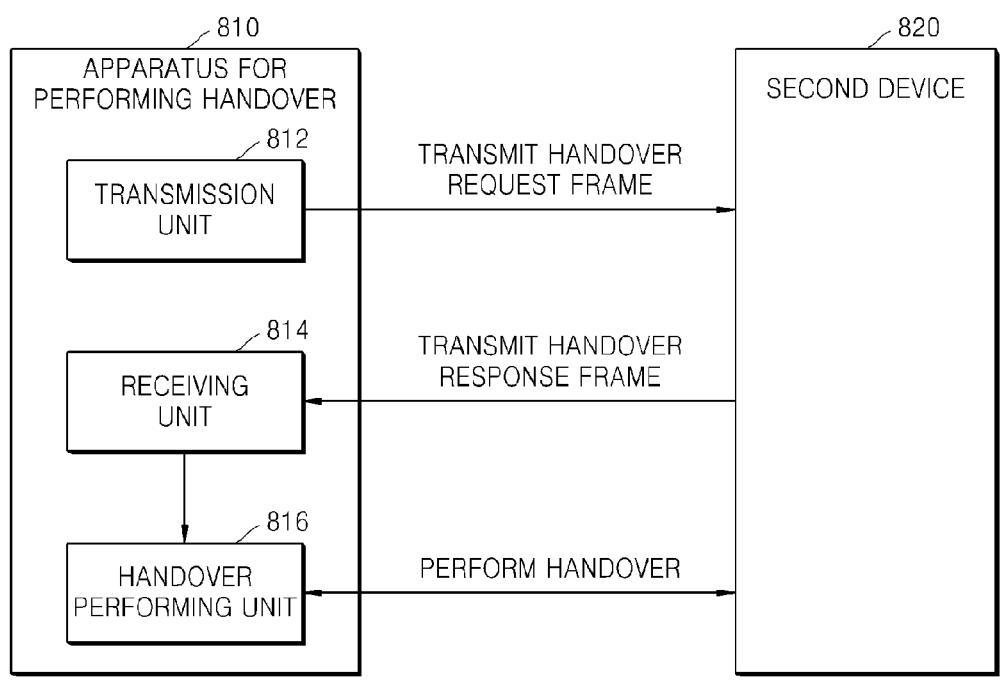
FIG. 8 is a block diagram of an apparatus for performing a handover according to an exemplary embodiment.

FIG. 8 is a block diagram of an apparatus for performing a handover 810 according to an exemplary embodiment.

Referring to FIG. 8, the apparatus for performing a handover 810 according to the current exemplary embodiment includes a transmission unit 812, a receiving unit 814, and a handover performing unit 816. In this regard, it is assumed that the apparatus for performing a handover 810 according to the current exemplary embodiment is installed on a first device (not shown). In another exemplary embodiment, the apparatus for performing a handover 810 may be a first device. In addition, for convenience of explanation, a second device 820 is further provided.

The transmission unit 812 includes information about a reason for requesting a handover and transmits a handover request frame for requesting a handover to the second device 820.

The receiving unit 814 receives a handover response frame including handover request result information indicating whether the handover request is accepted from the second device 820. The handover performing unit 816 selectively performs a handover with the second device 820 based on the handover response frame.

The exemplary embodiments can also be embodied as computer readable codes on a computer readable recording medium. The computer readable recording medium is any data storage device that can store data which can be thereafter read by a computer system. Examples of the computer readable recording medium include, but are not limited to, read-only memory (ROM), random-access memory (RAM), CD-ROMs, magnetic tapes, floppy disks, optical data storage devices, etc.

While this inventive concept has been particularly shown and described with reference to exemplary embodiments thereof, it will be understood by those of ordinary skill in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the exemplary embodiments is defined not by the detailed description of the exemplary embodiments but by the appended claims, and all differences within the scope will be construed as being included in the exemplary embodiments.

What is claimed is:

1. A method of performing a handover between a first device and a second device, the method comprising:
   transmitting, to the second device, a handover request frame for requesting a handover, the handover request frame including information about a reason for requesting the handover;
   receiving, from the second device, a handover response frame including handover request result information indicating whether the handover request is accepted;
   selectively performing the handover with the second device based on the handover response frame, and
   wherein the reason for requesting the handover is a first reason that the first device has a higher operating capability as a personal basic service set (PBSS) control point (PCP) than the second device, or a second reason that the first device is to operate as a PCP to provide specific services.

2. The method of claim 1, wherein the first device and second device both belong to a personal basic service set (PBSS), and the first device is a station, and the second device is a PBSS control point (PCP) in the PBSS.

3. The method of claim 2, wherein the handover request frame is transmitted only when the first device has one of the first reason or the second reason for requesting the handover.

4. The method of claim 2, wherein the handover response frame further comprises information about a reason for rejecting the handover request when the handover request result information indicates rejection of the handover request.

5. The method of claim 4, wherein the reason for rejecting the handover request is that a remaining amount of power of the first device is less than a predetermined threshold value, that the first device is in a bad communication link state, that a number of stations joined with the second device exceeds a maximum number of stations that can perform association with the first device, that the first device is being affected by interference, that a region of the first device in which communication is available is smaller than a region of the second device in which communication is available and thus the first device is to join with less stations than the second device, that the first device is leaving the PBSS, that the second device is providing specific services, that a number of beacon intervals (BIs) that remain in the second device when the first device transmits the handover request frame, is less than a threshold value, or that the first device wants to change a currently-used frequency band of a communication link into a different frequency band.

6. The method of claim 1, wherein the first device and the second device both belong to a PBSS, and the first device is a PCP in the PBSS, and the second device is a station.

7. The method of claim 6, wherein the reason for requesting the handover is that the first device is leaving the PBSS, that the remaining amount of power of the first device is less than a predetermined threshold value, that there is a station having a higher operating capability as a PCP than the first device, that the first device is in a bad communication link state, or that the number of stations to join the first device exceeds a maximum number of stations that can perform association with the first device.

8. The method of claim 6, wherein the handover response frame further comprises information about a reason for rejecting the handover request when the handover request result information indicates rejection of the handover request.

9. The method of claim 6, wherein the reason for rejecting the handover request is that a remaining amount of power of the second device is low, that the second device is in a bad communication link state, that a number of stations joined with the first device exceeds a maximum number of stations that can perform association with the second device, that the second device is being affected by interference, that the second device is to continuously provide specific services, that a region of the second device in which communication is available is smaller than a region of the first device in which communication is available and thus the second device is to join with less stations than the first device, that the second device is providing services in which a quality of service (QoS) should be guaranteed, that the second device is leaving the PBSS, or that the second device is to change a currently-used frequency band of a communication link into a different frequency band.

10. The method of claim 1, wherein the handover request frame further comprises information about a number of beacon intervals (BIs) that remain in the second device, during a period between the time when the handover request frame is transmitted and the time when the handover is performed.

11. An apparatus for performing a handover between a first device and a second device, the apparatus comprising:
   a transmitter, which transmits, to the second device, a handover request frame for requesting a handover, the handover request frame includes information about a reason for requesting the handover;
   a receiver, which receives, from the second device, a handover response frame which includes handover request result information indicating whether the handover request is accepted; and
   a handover performing device which selectively performs the handover with the second device based on the handover response frame,
   wherein the reason for requesting the handover is a first reason that the first device has a higher operating capability as a personal basic service set (PBSS) control point (PCP) than the second device, or a second reason that the first device is to operate as a PCP to provide specific services.

12. The apparatus of claim 11, wherein the first device and the second device both belong to a personal basic service set (PBSS), and the first device is a station, and the second device is a PBSS control point (PCP) in the PBSS.

13. The apparatus of claim 12, wherein the handover request frame is transmitted only when the first device has one of the first reason or the second reason for requesting the handover.

14. The apparatus of claim 12, wherein the handover response frame further comprises information about a reason for rejecting the handover request when the handover request result information indicates rejection of the handover request.

15. The apparatus of claim 14, wherein the reason for rejecting the handover request is that the remaining amount of power of the first device is less than a predetermined threshold value, that the first device is in a bad communication link state, that the number of stations joined with the second device exceeds a maximum number of stations that can perform association with the first device, that the first device is being affected by interference, that a region of the first device in which communication is available is smaller than a region of the second device in which communication is available and thus the first device is to join with less stations than the second device, that the first device is leaving the PBSS, that the second device is providing specific services, that the number of beacon intervals (BIs) that remain in the second device when the first device transmits the handover request frame, is less than a threshold value, or that the first device wants to change a currently-used frequency band of a communication link into a different frequency band.

16. The apparatus of claim 11, wherein the first device and the second device both belong to a PBSS, and the first device is a PCP in the PBSS, and the second device is a station.

17. The apparatus of claim 16, wherein the reason for requesting the handover is that the first device is leaving the PBSS, that the remaining amount of power of the first device is less than a predetermined threshold value, that there is a station having a higher operating capability as a PCP than the first device, that the first device is in a bad communication link state, or that the number of stations to join the first device exceeds a maximum number of stations that can perform association with the first device.

18. The apparatus of claim 16, wherein the handover response frame further comprises information about a reason for rejecting the handover request when the handover request result information indicates rejection of the handover request.

19. The apparatus of claim 16, wherein the reason for rejecting the handover request is that a remaining amount of power of the second device is low, that the second device is in a bad communication link state, that a number of stations joined with the first device exceeds a maximum number of stations that can perform association with the second device, that the second device is being affected by interference, that the second device is to continuously provide specific services, that a region of the second device in which communication is available is smaller than a region of the first device in which communication is available and thus the second device is to join with less stations than the first device, that the second device is providing services in which a quality of service (QoS) should be guaranteed, that the second device is leaving the PBSS, or that the second device is to change a currently-used frequency band of a communication link into a different frequency band.

20. The apparatus of claim 11, wherein the handover request frame further comprises information about a number of beacon intervals (BIs) that remain in the second device during a period between the time when the handover request frame is transmitted and the time when the handover is performed.

21. A non-transitory computer readable recording medium having embodied thereon that, when executed by a computer, causes the computer to perform a method of performing a handover between a first device and a second device, the method comprising:
    transmitting, to the second device, a handover request frame for requesting a handover, the handover request frame including information about a reason for requesting the handover;
    receiving, from the second device, a handover response frame including handover request result information indicating whether the handover request is accepted; and
    selectively performing the handover with the second device based on the handover response frame,
    wherein the reason for requesting the handover is a first reason that the first device has a higher operating capability as a personal basic service set (PBSS) control point (PCP) than the second device, or a second reason that the first device is to operate as a PCP to provide specific services.

* * * * *